United States Patent [19]

McMaster et al.

[11] Patent Number: 4,525,193
[45] Date of Patent: Jun. 25, 1985

[54] METHOD AND APPARATUS FOR SUPPLYING COOLING AIR IN A GLASS SHEET QUENCH

[75] Inventors: Ronald A. McMaster, Woodville; John S. Nitschke, Perrysburg, both of Ohio

[73] Assignee: Glasstech, Inc., Perrysburg, Ohio

[21] Appl. No.: 551,572

[22] Filed: Nov. 14, 1983

[51] Int. Cl.³ ............................................. C03B 27/04
[52] U.S. Cl. ...................................... 65/114; 65/104; 65/348; 65/351
[58] Field of Search ................... 65/108, 114, 348, 351

[56] References Cited

U.S. PATENT DOCUMENTS 3,776,709 12/1973 Melling et al. .................... 65/104 X
4,004,901 1/1977 Starr ................................. 65/104 X Primary Examiner—Arthur Kellogg
Attorney, Agent, or Firm—Brooks & Kushman

[57] ABSTRACT

A method and apparatus are disclosed for operating an air supply system for a glass sheet quench including a D.C. drive system of a variable speed blower operated on a duty cycle. A quench cycle and a cooling cycle are carried out in the quench. In the preferred embodiment shown for thin glass (i.e. glass which is 5 mm or less in thickness) the drive system is sized to the RMS requirements of the complete cycle to minimize the initial and operating costs, size and power requirements of the D.C. drive system.

8 Claims, 6 Drawing Figures

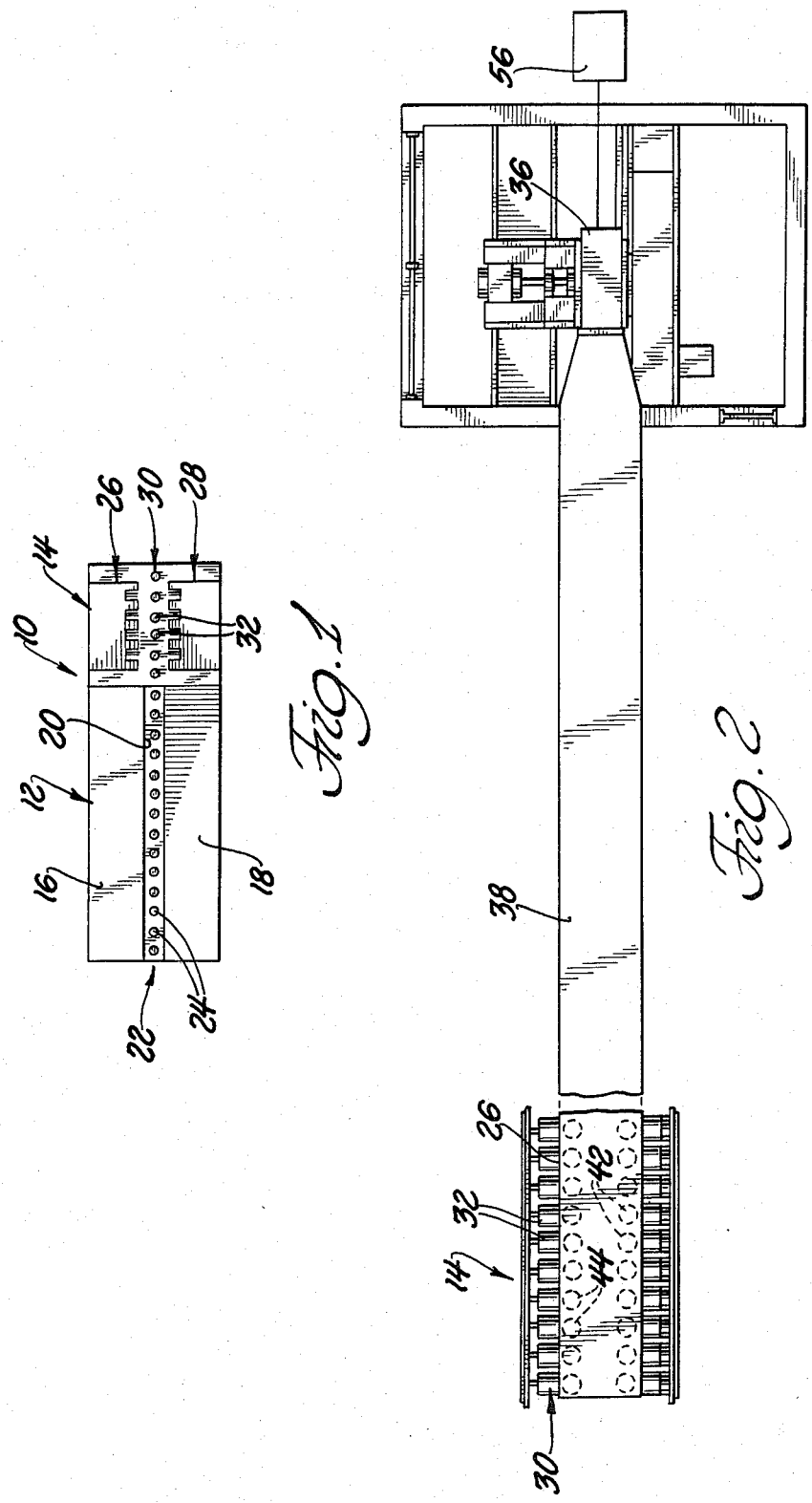

METHOD AND APPARATUS FOR SUPPLYING COOLING AIR IN A GLASS SHEET QUENCH

TECHNICAL FIELD

This invention relates to method and apparatus to improve glass sheet quenching and cooling and, in particular, to method and apparatus for supplying cooling air to improve glass sheet quenching and cooling.

BACKGROUND ART

Glass sheets are quenched to provide tempering or heat strengthening in order to increase the mechanical strength of the glass and hence provide an increased resistance to breakage as compared to annealed glass. The sudden cooling process gives the glass sheets high compressive forces at their surfaces. Tempered glass sheets are less susceptible to breakage and break into small pieces that are dull and relatively harmless instead of into large pieces as in the case of untempered glass.

In tempering, quenching gas is impinged with the opposite surfaces of the glass sheet to provide rapid cooling thereof such that the finally cooled glass sheet has compressive forces at its surfaces and tensile forces at its center.

With heat strengthening, quenching gas is also impinged with the opposite surfaces of the glass sheet but at a much lower rate and thereby provides the surfaces of the glass with compressive forces but at a much lower level than is involved with tempering. Both tempering and heat strengthening can be performed on flat glass sheets such as are conveniently used for architectural purposes and on bent glass sheets such as are conveniently used for vehicle windows.

Glass sheet quenches conventionally include opposed blastheads, each of which have elongated plenum housings or banks of nozzles that are spaced from each other and supply pressurized quenching gas to a heated glass sheet positioned between the blastheads. The plenums are spaced from each other to leave room for spent quenching gas to flow away from the glass sheet and between the plenums for flow out from between the blastheads. Normally, the quenching gas is supplied in discrete jets that are spaced along the length of each plenum housing as disclosed by U.S. Pat. No. 3,936,291. Quenching jets are normally supplied in a parallel relationship to each other to provide tempering of flat glass sheets which are positioned between the opposed blastheads of the quench, extending in a perpendicular relationship to the quenching jets.

In quenching glass sheets a greater amount of quenching gas must be supplied as the glass sheets become thinner than in the case with thicker glass sheets. The pressure and power requirements in supplying the quenching gas are hyperbolic functions of glass thickness. Consequently, as glass thickness decreases, the power, size and investment required for the air supply system for the quenching gas increases rapidly. This is especially true for batch-loaded oscillatory tempering systems with one or multiple load heating capacity.

One possible solution to this increased need for quenching gas is to reduce the length of the device providing the quench to something less than the largest glass length and follow it by a full-length cooler. The glass may be passed through the quench at a rate sufficiently slow to impart the optimal degree of tempering and thereafter into the cooler where it oscillates until the next piece of glass is passed therethrough.

This approach minimizes the length of the high-powered quenching unit and therefore the size and power requirements of the drive system of the blower as well. Further energy savings can be realized by shutting the quench unit off when a glass sheet is not present therein. However, there are many problems associated with this approach. For example, two sets of blowers and two sets of ductwork are required for each air supply system. Also, the low speed required for passing the glass sheet through the quench unit to ensure the proper degree of temper makes flatness control a problem, especially on wide sheets of glass. For example, when hot glass sheets move from the furnace into the quench unit, warpage and breakage tend to occur because the leading edge of the glass is being cooled and caused to shrink, while the trailing end is still hot and in its thermally expanded condition. This tendency is more severe, the slower the travel and the wider the glass.

DISCLOSURE OF THE INVENTION

An object of the present invention is to provide an improved air supply system in a glass quench having a quench cycle and a cooling cycle wherein the system includes a drive system of a variable speed blower and opposed blastheads which are spaced from each other and supply pressurized gas from the blower to a heated glass sheet positioned between the blastheads. In carrying out this object, the drive system is operated on a duty cycle rather than on a continuous basis.

Another object of this invention is to provide a method and apparatus for operating an air supply system for a glass sheet quench having a quench cycle and a cooling cycle wherein the system includes a drive system, a variable speed blower and opposed blastheads which are spaced from each other and supply pressurized gas from the blower to a heated glass sheet positioned between the blastheads. In carrying out this object the peak power output of the drive system during the quenching cycle is greater than its rated power output to thereby reduce the initial and operating costs, and size and power requirements of the drive system.

A further object of this invention is to provide a method and apparatus for operating an air supply system for a glass sheet quench having a quench cycle and a cooling cycle, the system including a drive system of a single variable speed blower and opposed blastheads, which are spaced from each other and supply pressurized gas from the blower to a heated glass sheet positioned between the blastheads. In carrying out this object the glass sheet quench is able to quench and cool the glass sheets after receiving the glass sheets at a speed fast enough so that flatness control is not a significant problem and therein the size and power requirements of the drive system are minimized.

In carrying out the above objects and other objects of this invention a preferred embodiment of the invention comprises a method for operating the air supply system for a glass sheet quench having a quench cycle and a cooling cycle. The system includes a drive system of a variable speed blower and opposed blastheads which are spaced from each other and supply pressurized gas from the blower to a heated glass sheet positioned between the blastheads. The method includes the steps of operating the blower at substantially full pressure at a first speed and thereafter operating the blower at a pressure reduced from the full pressure at a second speed different from the first speed wherein the system supplies the pressurized gas at a pressure to quench the glass sheet at one of the first and second speeds during the quench cycle and the system supplies the pressurized gas at a pressure to cool the glass sheet at the other of the first and second speeds during the cooling cycle. The peak power output of the drive system during full pressure is greater than the rated power output of the drive system.

Further in carrying out the above objects and other objects of this invention, an air supply system for a glass sheet quench includes a drive system of a variable speed blower and opposed blastheads which are spaced from each other and which supply pressurized gas from the blower to the heated glass sheet between the blastheads. A control means controls the drive system to operate the blower at substantially full pressure at a first speed to supply pressurized gas to quench the glass sheet during a quench cycle. The control means also controls the drive system to operate the blower at a pressure reduced from the full pressure at a second speed different from the first speed to supply pressurized gas to cool the glass sheet during the cooling cycle. The drive system is sized so that its peak power output during full pressure is greater than the rated power output of the drive system.

Preferably, the drive system is sized or rated so as to operate at substantially peak power well above its rated power during either the quench cycle or the cooling cycle. In this way savings of as much as 33% can be achieved.

The objects, features and advantages of the present invention are readily apparent from the following detailed description of the best mode for carrying out the invention when taken in connection with the accompanying drawings.

BRIEF DESCRIPTION OF THE DRAWINGS

FIG. 1 is a schematic side elevation view of a glass tempering system including an air supply system of quench constructed and operated in accordance with the present invention;

FIG. 2 is a top plan view of a glass tempering system including an air supply system operated and constructed in accordance with the present invention;

BEST MODE FOR CARRYING OUT THE INVENTION

Figure 3:
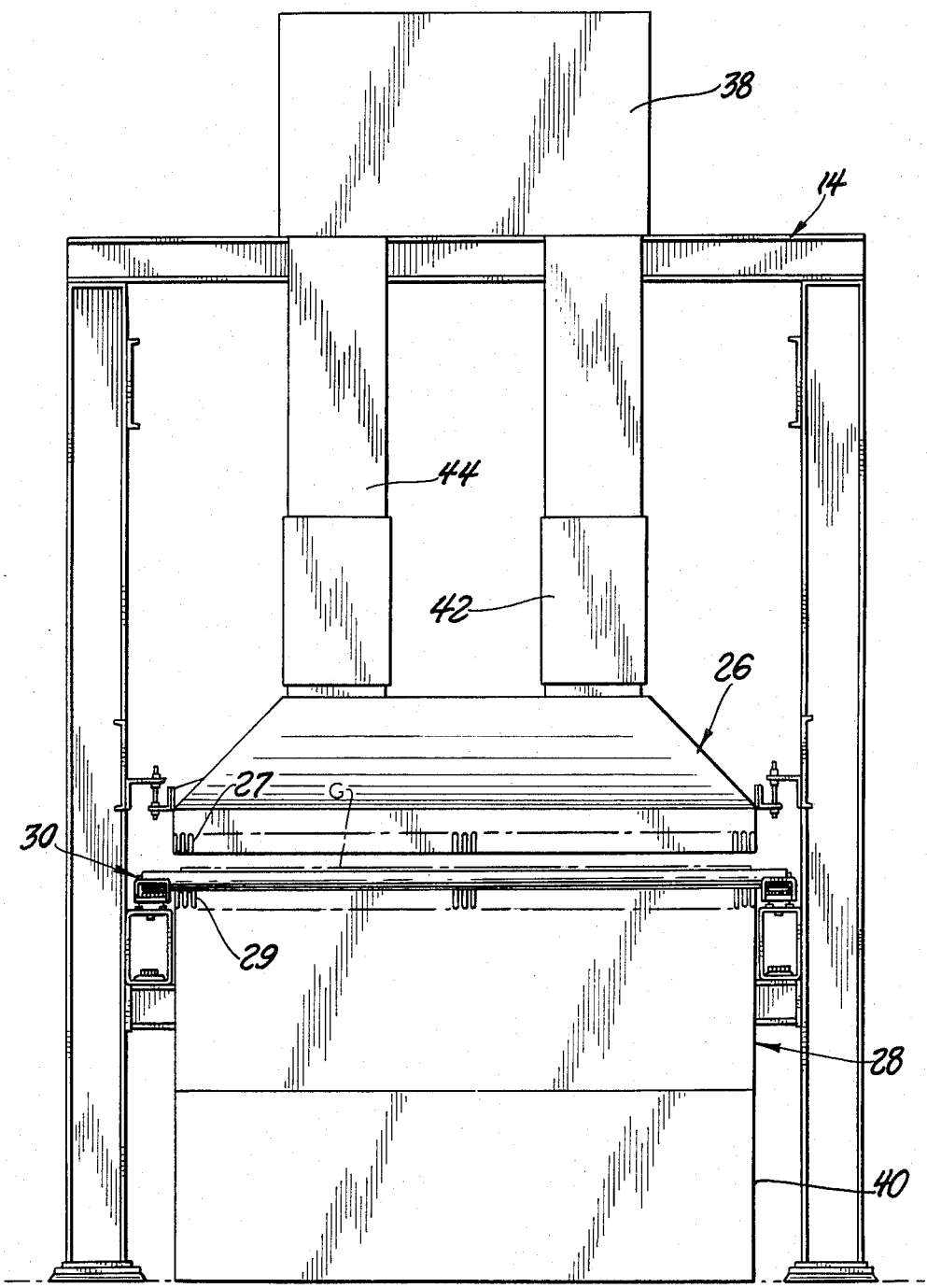
FIG. 3 is an end view of the air supply system of FIGS. 1 and 2.

Referring to FIG. 1 of the drawings, a glass tempering system, generally indicated at 10, includes a furnace 12 for heating glass sheets to a sufficiently high temperature for tempering. The system 10 also includes a quench 14 having an air supply system constructed and operated in accordance with the present invention to provide quenching that tempers the heated glass sheets and cooling as is hereinafter more fully described.

The furnace 12 is preferably of the type disclosed in U.S. Pat. Nos. 3,934,970; 3,947,242; and 3,994,711 so as to include an upper housing 16 and a lower housing 18 that cooperatively define a side slot 20 at the opposite lateral sides of the furnace 12.

A roller conveyor 22 of the furnace 12 includes conveyor rolls 24 whose opposite ends project outwardly through the furnace side slots 20 for frictional driving in the manner disclosed in the aforementioned patents. A flat glass sheet to be heated is introduced into the furnace 12 through an access opening at its left end and is conveyed within a suitably heated interior chamber by the conveyor rolls 24 for heating to a sufficiently high temperature (for example, between 1,200° to 1,300° F.) for subsequent tempering upon leaving the furnace 12 through an exit opening at its right end adjacent the quench 14. It should also be mentioned that the quench 14 can be utilized to provide heat strengthening of glass sheets by delivering a lower volume flow rate of quenching gas than that necessary to perform the tempering.

With combined reference to FIGS. 1 and 3, the quench 14 includes upper and lower opposed blastheads 26 and 28 which, in turn, include upper and lower banks of nozzles 27 and 29, respectively.

The quench 14 also includes a roller conveyor 30 having conveyor rolls 32 for conveying a heated glass sheet G between the blastheads 26 and 28 for quenching and subsequently thereafter for cooling. The banks of nozzles 27 and 28 are spaced from each other and supply pressurized quenching gas to the heated glass sheet G positioned between the blastheads on the roller conveyor 30 in a manner which is hereinafter more fully described.

The quench unit 14 includes a drive system 36 of a fan or blower. The blower supplies quenching air through upper and lower ducts 38 and 40, respectively. The drive system 36 comprises a variable speed blower motor, a transformer, a drive and switch gear sized or rated to the maximum air pressure required for the thinnest glass to be quenched and cooled in the quench unit 14.

Figure 4:
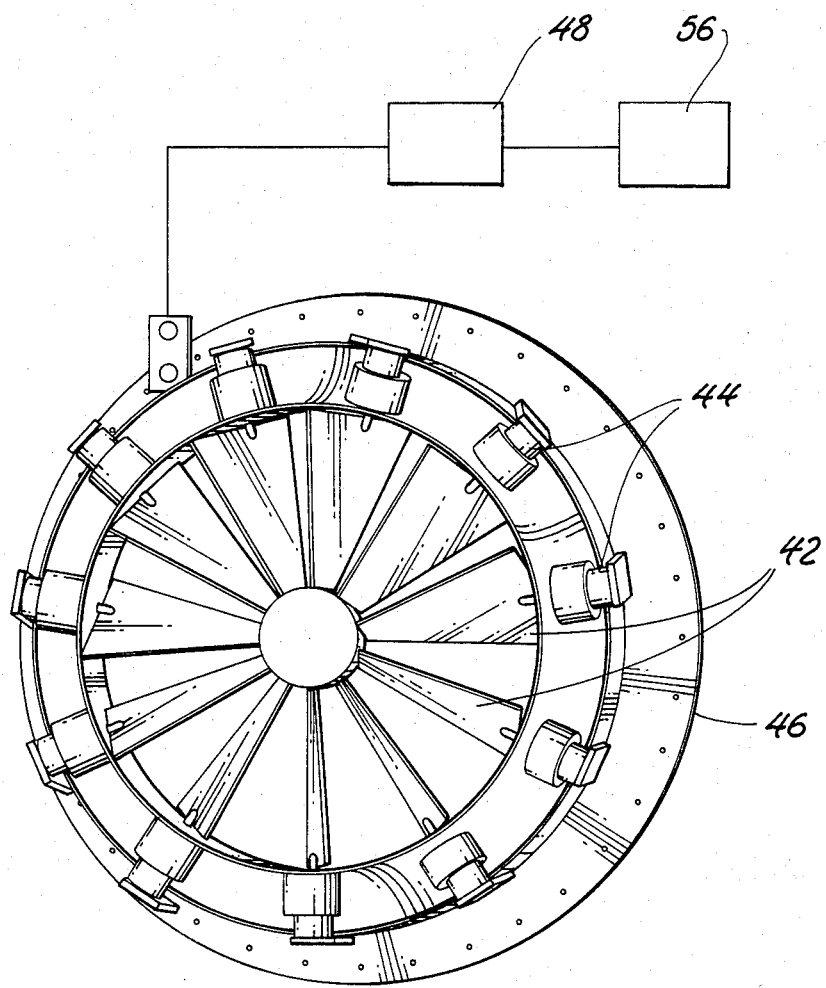
FIG. 4 is a view of the vanes of the blower and associated control for the vanes.

Referring now to FIG. 4 there is illustrated a plurality of adjustable inlet vanes 42 of the blower. Each of the vanes 42 are individually driven by motors 44. The motors 44 are circumferentially mounted on a circular support structure 46 in driving engagement with their associated vanes 42. The motors 44 are automatically controlled by a motor control circuit 48 which, in turn, is controlled by a controller 56. The controller 56, which is preferably programmable, also controls the operation of the drive system 36 as shown in FIG. 2.

Upon the receipt of proper control signals from the controller 56, the control circuit 48 controls the operation of the motors 44. In this way the vanes 42 are moved between open and closed positions, thereby alternately allowing and restricting the flow of air into the blower.

Figure 5:
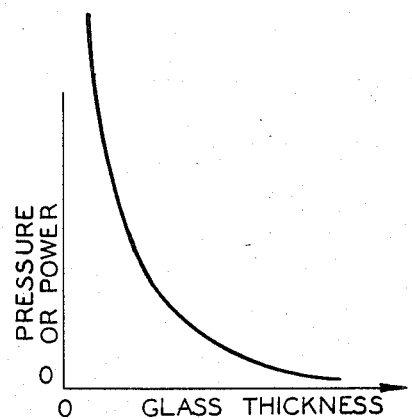
FIG. 5 is a graph illustrating the pressure or power requirements for tempering glass as a function of glass thickness.

Pressure and power requirements for tempering glass are hyperbolic functions of glass thickness as indicated in FIG. 5. In other words, the pressure and power requirements in providing the quenching gas are functions of the inverse of the drive system. The drive system is preferably provided to minimize the power requirements in quenching thin glass such as thin architectural glass. By running the blower at full pressure and the drive system at substantially above its rated power output during quenching and reduced pressure during cooling the power requirements can be minimized by as much as ⅓. Also, by providing a single blower the size of the quench 14 is reduced to as small an area as possible to improve the planarity of the thin glass when produced on a low production basis. Because the rated power requirement is less than the peak requirement, the blower drive and the blower motor of the blower are down-sized based on the duty cycle of the blower. In this way quench power is minimized and the planarity of the glass sheets is improved.

Figure 6:
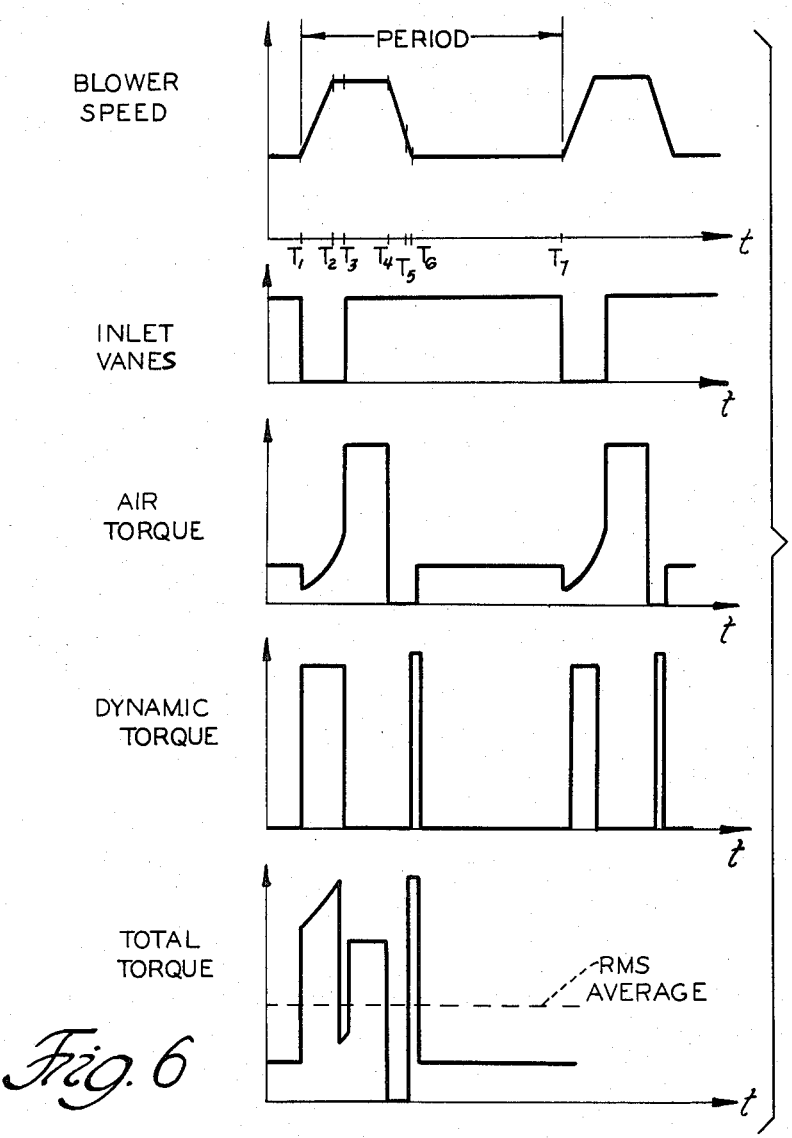
FIG. 6 is a series of graphs, having the same time base, showing the interrelationship between the various components of the air supply system and air pressure or power.

Referring now to FIG. 6 there is shown in graphic form the operation of the air supply system for one period of a quench and cooling cycle wherein the blower is run intermittently and at different speeds rather than continuously. In the first graph of FIG. 6 the blower speed increases from the start of the indicated period until quenching speed is achieved. In order to minimize acceleration time, the inlet vanes 42 are closed to minimize the air horsepower required as shown in the second graph of FIG. 6.

The following table represents a hypothetical operation of the air supply system including the blower to quench and cool four millimeter glass.

| TIME RANGE | FUNCTION | DURATION SECONDS | CURRENT AMPS | % OF TOTAL CYCLE TIME | % OF AVAILABLE HEAT DISSIPATION ($I^2/800$) × % OF TOTAL TIME | SPEED RPM | KW AVERAGE |
|---|---|---|---|---|---|---|---|
| 0-6 | Close vanes & acc | 6 | 1200 | .08 | .18 | 613-1016 | 20.8 |
| 6-8 | Hold at speed-vanes closed | 2 | 780 | .02666 | .02534 | 1016 | 5.6 |
| 8-23 | Open vanes & -quench | 15 | 830 | .2000 | .2153 | 1016 | 44.9 |
| 23-37 | Coast | 14 | 0 | .18666 | — | — | — |
| 37-38 | Stop DEC | 1 | 1200 | .013333 | .02999 | 613 | 2.6 |
| 38-75 | Cool | 37 | 310 | .493333 | .07407 | 613 | 25.0 |
| | Totals | 75 | | | .5247 | | 98.9 |

In the above hypothetical, between times T1 and T2 as shown in FIG. 6 the vanes 42 are held closed while the blower motor is accelerated to a quenching speed of approximately 1,016 rpm. Between times T2 and T3 the blower motor is held at this speed for approximately two seconds with the vanes 42 closed. Between times T3 and T4 the vanes 42 are open while the blower motor speed is maintained to allow the glass sheets to be quenched. After quenching, the power to the blower motor is removed and coasting occurs for a duration of approximately 14 seconds between times T4 and T5 in order to decelerate the blower motor. In order to stop the deceleration, power is applied to the blower motor for approximately one second in order to achieve the cooling speed between times T5 and T6. Between times T6 and T7, the cooling portion of the cooling period is entered which comprises one-half of the period.

As shown in the table and the last graph of FIG. 6, peak power requirements occur between times T1 and T2 and between times T5 and T6. This peak power level corresponds to the maximum rating of the blower drive and the blower drive motor. However, the switch gear, the blower motor and the blower drive is sized to the average power consumption or the rms average as shown in the last graph in FIG. 6 during the quench cooling cycle.

In the example shown for four millimeter glass, an average horsepower of 132 is required. 300 horsepower is required during the quench portion of the period and 66 horsepower is required during the cooling portion of the cycle. A similar example for three millimeter glass will require 1252 horsepower during the quench portion of the cycle. However, if the blower is operated on a duty cycle basis, only an 800 horsepower drive and motor are required.

The quenching and cooling are carried out in a single quench unit 14, and a single blower and ductwork set is required. The glass sheets are allowed to enter into the quench unit 14 in a relatively rapid fashion (approximately 150 feet per minute) so that the entire piece of glass is quenched simultaneously, thereby resulting in a flatter piece of glass.

The blower may also be operated to quench and cool relatively thick glass. In this situation the motor of the blower is decelerated from a cooling speed to a quench or heat strengthening speed as rapidly as possible after the motor has been accelerated from its quenching speed to its cooling speed. In this way quenching and cooling of relatively thick glass can be obtained in a single quench unit by operating the blower on a duty cycle basis.

The following advantageous features follow from the present invention:

(1) quenching and cooling are carried out in the same device;

(2) only a single blower, drive system and ductwork set is required;

(3) operating costs are lowered by minimizing energy usage;

(4) the blower drive, motor, transformer and switch gear costs are minimized by as much as ⅓ in that they are sized to the rms requirements of the quench and cooling cycle; and (5) the glass is allowed to index into the quench unit 12 relatively rapidly so that the whole glass piece is quenched simultaneously, thereby resulting in a flatter piece.

While a preferred embodiment of the subject invention has been shown and described herein in detail, those skilled in this art will recognize various alternative designs and embodiments for practicing the present invention as defined by the following claims.

What is claimed is:

1. A method for operating an air supply system for a glass sheet quench having a quench cycle and a cooling cycle, the system including a drive system of a variable speed blower and opposed blastheads which are spaced from each other and supply pressurized gas from the blower to a heated glass sheet positioned between the blastheads, the method including the steps of:

restricting the flow of pressurized gas from the blower when changing the speed of the blower;

operating the blower at substantially full power at a first speed to intially cool the heated glass sheet;

at least partially removing the restriction to permit increased flow of the pressurized gas; and thereafter operating the blower at less than the full power to further cool the glass sheet, whereby the system supplies the pressurized gas at a pressure to quench the glass sheet at one of said first and second blower speeds during the quench cycle and the system supplies the pressurized gas at a pressure to cool the glass sheet at the other of said first and second blower speeds during the cooling cycle.

2. A method for operating an air supply system for a glass sheet quench having a quench cycle and a cooling cycle, the system including an air duct, a drive system of a variable speed blower for supplying pressurized air to the air duct, and opposed blastheads which are spaced from each other and supply pressurized gas from the air duct to a heated glass sheet positioned between the blastheads, the method including the steps of:

operating the blower at an initial speed;
restricting the flow of air from the blower;
changing the speed of the blower to a first speed;
allowing the air to flow from the blower;
operating the blower at substantially full pressure at the first speed; and
changing the speed of the blower to a second speed different from the first speed wherein the blower is operated at a pressure reduced from the full pressure and wherein the system supplies the pressurized gas at a pressure to quench the glass sheet at one of said first and second speeds during the quench cycle and the system supplies the pressurized gas at a pressure to cool the glass sheets at the other of the first and second speeds during the cooling cycle and wherein the peak power output of the drive system during full pressure is greater than the rated power output of the drive system.

3. The method as claimed in claim 2 wherein the air supply system includes vanes for controlling the flow of air from the blower and wherein said step of restricting includes the step of substantially closing the vanes.

4. The method as claimed in claim 1 or claim 2 or claim 3 including the step of reducing the speed of the blower from the one of the first and second speeds to the other of the first and second speeds wherein said step of reducing includes the step of substantially removing the flow of energizing current from the drive system.

5. The method as claimed in claim 4 wherein said step of reducing includes the step of supplying substantially the maximum allowable amount of power to the drive system immediately after said step of removing.

6. In an air supply system for a glass sheet quench including a drive system of the variable speed blower and opposed blastheads, which are spaced from each other and supply pressurized gas from the blower to a heated glass sheet positioned between the blastheads, the improvement comprising:

means for restricting air flow from the blower; and
control means for controlling the means for restricting when changing the speed of the blower and then to permit increased flow of the pressurized gas, said control means also controlling the drive system to operate the blower at substantially full pressure at a first speed to supply pressurized gas to quench the glass sheet during the quench cycle; and for controlling the drive system to operate the blower at a pressure reduced from the full pressure at a second speed different from the first speed to supply pressurized gas to cool the glass sheet during a cooling cycle.

7. In an air supply system for a glass sheet quench including an air duct, a drive system of a variable speed blower for supplying pressured air to the air duct, vanes having an open position and a closed position to control the flow of air into the air duct, from the blower and opposed blastheads which are spaced from the air duct to a heated glass sheet positioned between the blastheads, the improvement comprising:

control means for controlling the drive system to operate the blower at full and reduced pressures at first and second speeds, respectively, and moving the vanes between open and closed positions in synchronization therewith to supply pressurized gas to quench and cool the glass sheet during a quench cycle and a cooling cycle, respectively, and to minimize the amount of time required for the blower to change between the first and second operating speeds and where the peak power output of the drive system during full pressure is greater than the rated power output of the system.

8. The system as claimed in claim 7 wherein said control means moves said vanes to their closed position during acceleration of said blower.

* * * * *